May 22, 1923.
A. E. PROCTOR
INSERTIBLE TOOTH SAW
Filed Jan. 15, 1921
1,455,968
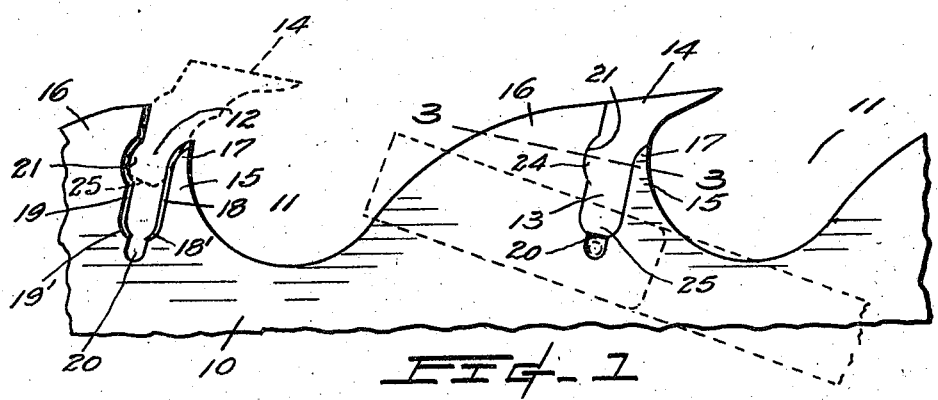
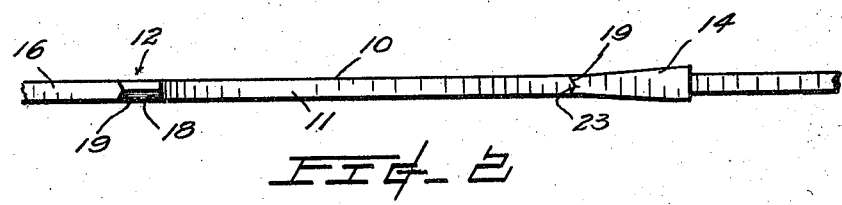
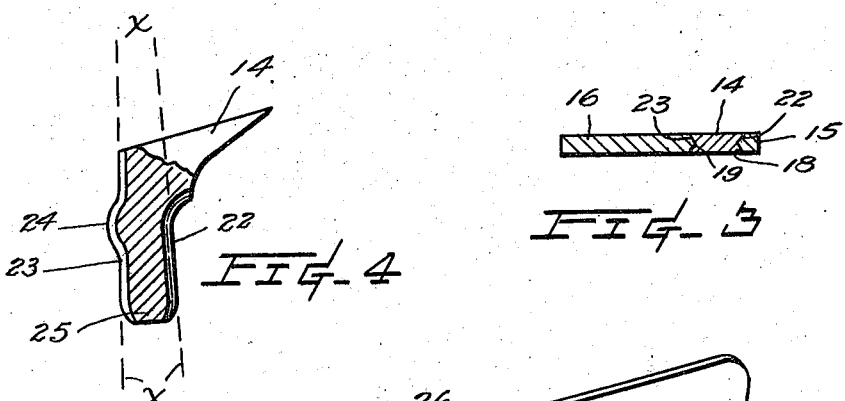
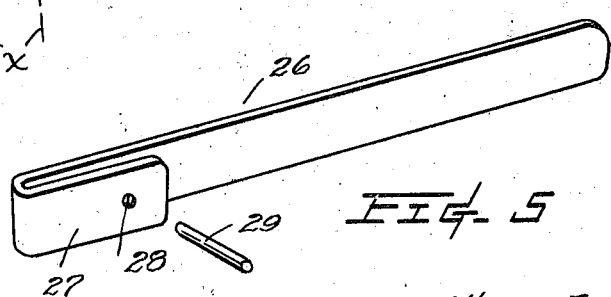
INVENTOR:
Albert E. Proctor
BY
Pierre James
ATTORNEY Patented May 22, 1923.

1,455,968

UNITED STATES PATENT OFFICE.

ALBERT E. PROCTOR, OF BELLINGHAM, WASHINGTON.

INSERTIBLE-TOOTH SAW.

Application filed January 15, 1921. Serial No. 437,395.

*To all whom it may concern:*

Be it known that I, ALBERT E. PROCTOR, a citizen of the United States, residing at Bellingham, in the county of Whatcom and State of Washington, have invented certain new and useful Improvements in Insertible-Tooth Saws, of which the following is a specification.

This invention relates to saws having insertible teeth; and its object is the improvement in saws of this character to render the same more rigid, durable and efficient in operation.

The invention consists in an insertible-tooth saw provided with peculiar shaped tooth receptacles which coact with the teeth to positively retain the latter in place without the use of rivets, cams or other supplementary fastening means.

The invention further consists in the novel construction, adaptation and combination of parts hereinafter described and claimed.

In the accompanying drawings, Figure 1 is a side elevation of a portion of a saw embodying the present invention. Fig. 2 is a plan view of the same. Fig. 3 is a detail section through line 3—3 of Fig. 1. Fig. 4 is a side elevation of a saw tooth, shown partly in longitudinal section. Fig. 5 is a perspective view of the preferred form of tooth-removing tool, the pin element thereof being detached from the stock.

The reference numeral 10 designates the body or blade of a saw provided with peripheral gullets 11. Each of the projections obtaining between the gullets 11 is formed to provide an aperture 12 to receive the shank 13 of a saw tooth 14.

Said apertures are, moreover, located in the front ends of the respective projections to provide a relatively narrow tongue 15 and a wide backing 16 to the front and back respectively of each aperture.

The front and rear edges 18 and 19 are substantially straight except that the inner ends $18^1$ and $19^1$ are rounded, the outer end of the front edge is curved forwardly, as at 17, and the rear edge 18 extends as at 21 to afford an arcuate shaped recess in the backing 16 and in opposed relation to the outer end of the associated tongue.

The front and rear edges of the apertures are beveled to a V-shape for engagement within correspondingly shaped grooves provided in the front and rear edges 22 and 23 (Fig. 4) of a tooth shank 13.

Said tooth shank is adapted to fit within an aperture 12 and is provided at its rear side with a projection 24 which engages in the recess 21.

The apertures and teeth shanks are furthermore formed to have their interfitting edges diverge downwardly as indicated by broken lines $x$—$x$ with respect to the tooth shown in Fig. 4 whereby the teeth make a dovetail connection, so to speak, within the respective apertures.

A tooth is inserted through the instrumentality of a hammer, the toe 25 of the shank, as illustrated by the dotted line tooth at the left hand side of Fig. 1, is first entered into the recess 21 and then by further forcing the tooth inwardly the tongue 15 is caused to be sprung forward to enable the tooth shank to become seated in a position similar to the tooth shown by full lines in Fig. 1.

The teeth may be extracted by means of a wedge shaped tool driven successively into blade slots 20 which communicate with the respective recesses.

I prefer for this purpose, however, to use a lever device such as shown in Fig. 5, comprising a metal bar 26 one end of which is doubled back as at 27 and having a hole 28 to receive a removable pin 29.

This tooth removing device, as illustrated by broken lines in Fig. 1, is employed by having the folded part thereof straddle a backing 16 to the rear of a tooth and inserting the pin 29 through the hole of the lever and the slot 20. Being thus arranged, the lever is actuated by the operator to eject a tooth without danger of mutilating the saw blade.

The advantages of the present invention reside principally in the provision of a saw having teeth and apertures therefor which mutually serve to positively retain the teeth in position and render the saw periphery more rigid.

By depending upon the teeth themselves for such positive locking engagement and not upon supplementary devices, such as rivets or rotary cams, the gullets 11 may be made large and of shapes to obviate their becoming packed with sawdust.

What I claim, is,—

The combination of a saw blade having teeth receiving apertures located between tongue and backing elements of the saw blade, with the forward edges of the tongues being curved, said tongues being resilient and provided at their outer ends with curved rear edges, said black elements being rigid and provided with recesses communicating with the apertures and in opposed relations to the curved portions of the respective tongues, and teeth having shank elements with rearwardly protruding portions to respectively seat within the aforesaid apertures and recesses, one of the exposed edges of the teeth lying in the same plane as the adjacent edge of the backing element, and the other exposed edge of the teeth being curved and continuous with the curvature of the forward edge of the tongue.

Signed at Bellingham, Washington, this 5th day of January 1921.

ALBERT E. PROCTOR.

Witnesses:
N. C. PHILLIPS, Jr.,
FRED C. ADAMS.